Dec. 17, 1957     M. P. FARLEY     2,816,481
ADJUSTABLE OPTICAL PRISM SYSTEM FOR PRODUCING
VARIATION IN SIZE OF IMAGES IN
PROJECTORS AND CAMERAS
Filed March 30, 1955     2 Sheets-Sheet 1
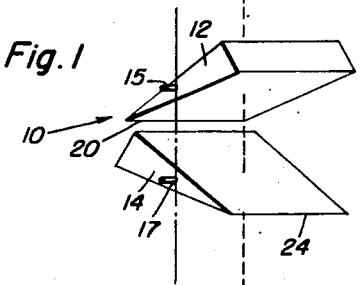
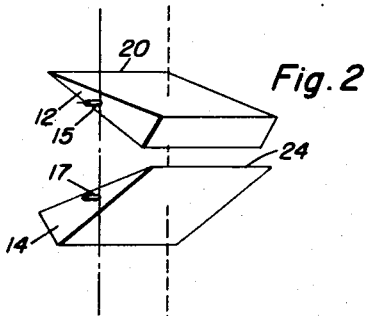
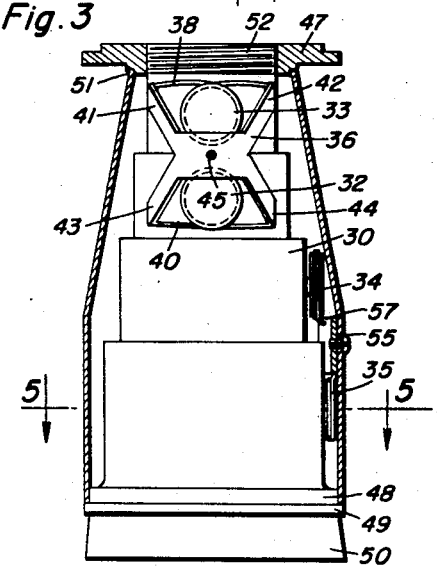
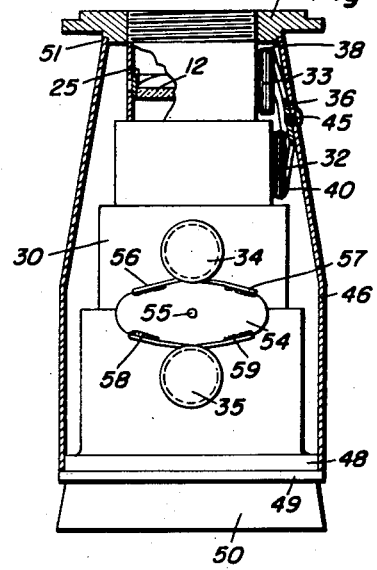
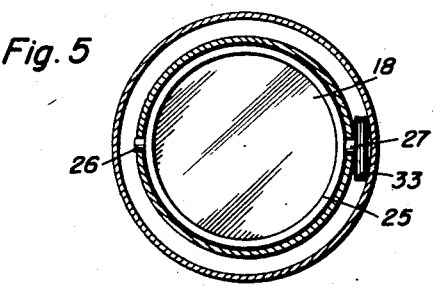
Marvin P. Farley
INVENTOR.
BY *Clarence A. O'Brien*
*and Harvey B. Jacobson*
Attorneys Dec. 17, 1957  M. P. FARLEY  2,816,481
ADJUSTABLE OPTICAL PRISM SYSTEM FOR PRODUCING
VARIATION IN SIZE OF IMAGES IN
PROJECTORS AND CAMERAS
Filed March 30, 1955  2 Sheets-Sheet 2
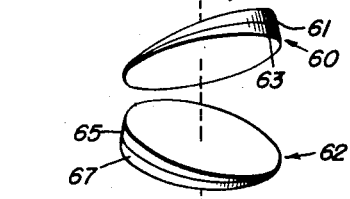
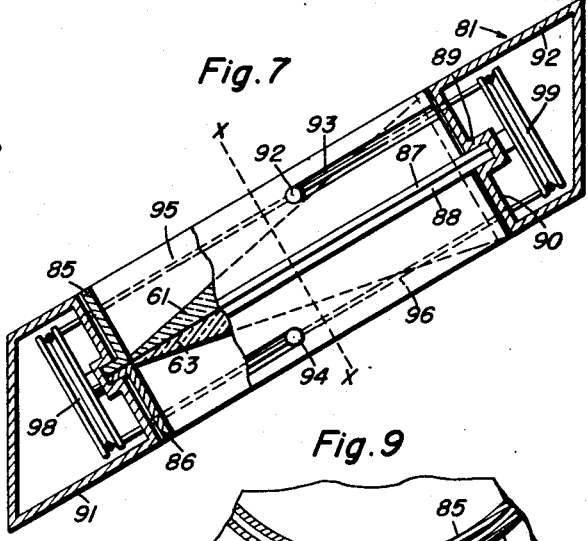
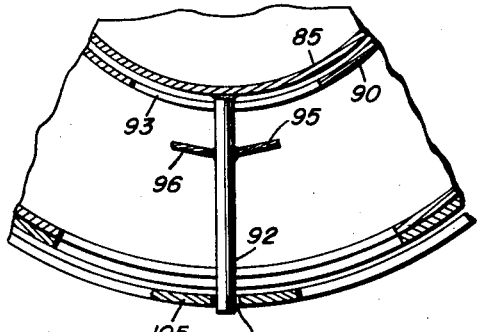
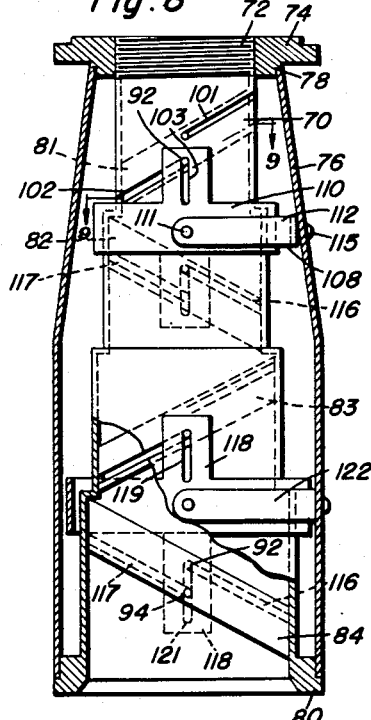
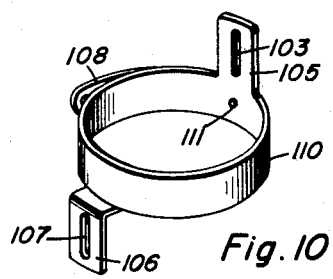
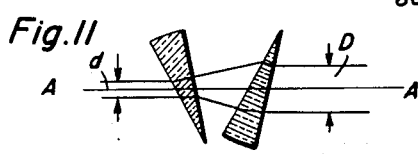
Marvin P. Farley
INVENTOR.
BY United States Patent Office 2,816,481
Patented Dec. 17, 1957

2,816,481

ADJUSTABLE OPTICAL PRISM SYSTEM FOR PRODUCING VARIATION IN SIZE OF IMAGES IN PROJECTORS AND CAMERAS

Marvin P. Farley, Cedar Grove, N. J.

Application March 30, 1955, Serial No. 497,885

13 Claims. (Cl. 88—57)

This invention relates to optical systems inserted into the paths of light rays and it has more particular reference to prism systems used, either alone or in conjunction, with other optical systems, such as lens systems, and it has for its principal object to provide a prism system which produces an enlargement (expansion) or reduction (compression) of an image without distortion of the same.

A further principal object of the invention consists in providing a prism system which permits a continuous adjustment of the enlarging or reducing effect obtained.

Prism systems inserted into the paths of the rays either between an object and the image of the object or between a projection picture and the projection thereof are well known by themselves. It is also well known that a system of prisms, as a rule, produces a distorted image if inserted into the path of the rays forming the image, the prism elongating (or compressing) the image essentially in one direction.

This fact has been made use of to construct prism objectives introducing a desired amount of distortion, especially a distortion in one direction. It is further also known that the distortion obtained by one prism may be corrected by using in conjunction therewith a further prism, so positioned that the plane in which distortion takes place is at 180° to the plane at which distortion is produced by the first named prism. Such prism systems consist usually of two prisms which cooperate and their main use is for directing rays in a desired direction differing from that which would be obtainable without the use of the prism system.

The present system according to the invention differs from known systems by the number of prism units which are used and with respect to the relative adjustability of the prisms of the system, and it further differs with respect to the uniformity of the adjustment made in connection with all units of the system. The prism systems according to the invention therefore may be used much more widely, some of the uses being of great practical importance. For instance, it is possible to adjust gradually to any desired degree the image projected by a lens system either on a sensitized surface or on a screen without any major adjustment of the lens system itself, so that enlargement or reduction of the picture occur in connection with completely fixed lens systems or in connection with lens systems which have already reached the limit of their adjustability. Further, it is possible with the system according to the invention to fill the gap now existing between enlargements or reductions obtainable with a lens system in its limit position and enlargements or reductions obtainable by the addition of a lens to or the removal of a lens from the said lens system.

Further, by means of the prism system according to the invention it is possible to enlarge an eccentric portion of an image, a result which was only obtainable by very specialized and complex means.

According to the invention a plurality of essentially symmetric prism systems are used, in conjunction with each other, each symmetric prism system forming a unit adjustable by itself, while all units are adjustable in an identical manner and remain symmetrical prism units in all positions to which they are brought during adjustment.

Further, according to the invention either the position of the prisms forming a unit with respect to each other may be changed in all units in the same manner, all units remaining however symmetrical units, or the prisms of the units may have a fixed position relatively to each other, but may consist of partial units or elements cooperating with each other, the composite angle of which may be changed. Such change may occur by rotating the partial or sub-units in opposite directions while maintaining the parallelism of the surfaces between the said partial units or elements.

It is, therefore, an object of the invention to provide means for changing the position of prism units consisting of a plurality of symmetrically arranged prisms with respect to each other, while maintaining their symmetry with respect to their original plane of symmetry.

It is a further object of the invention to provide simple and effective means for moving all units of a prism system, each consisting of a plurality of prisms, in such a manner that corresponding members of one unit, as well as corresponding members of all units are always moved to the same extent.

It is a further object of the invention to provide adjustability in prism systems with fixed position of the prism units, said adjustability being produced by subdivision of the prisms of the units into sub-units or elements cooperating with each other, and by the adjusting of the relative position of the said sub-units.

A further object of the invention consists in providing means for moving said sub-units which cooperate with each other, always to the same extent, the movement of the sub-units cooperating with each other occuring however in opposite directions.

It is a further object of the invention to provide means associated with such subdivided units, having a fixed relative spatial position, for imparting a rotational movement of the same angular extent to all the sub-units of the system, the sub-units cooperating with each other being however always rotated in opposite directions.

It is a further object of the invention to provide positive connections between the members of the system so as to impart a movement to all parts by moving a single member.

A number of further objects of the invention can only be explained in connection with the details of construction and operation which are more fully hereinafter described and claimed, reference being had to the accompanying drawings forming a part thereof. In the drawings two embodiments of the invention are illustrated by way of example. It is however to be understood that the drawings do not give a survey of all possible modifications and are merely exemplificative so that a departure from the embodiments illustrative is not necessarily a departure from the principle of the invention.

In the drawings:

Figures 1 and 2 are purely diagrammatic representations of optical prism systems in various positions intended to serve the purpose of explaining the general principle on which the invention is based.

Figures 3 and 4 are sectional elevational views taken at right angles to each other, the outer rotational casing and other parts being shown in a section along a plane of symmetry and part of the inner tube in Figure 4 being broken away.

Figure 5 is a sectional plan view of the device illustrated in Figures 3 and 4, the section being taken along a plane passing through line 5—5 of Figure 3.

Figure 6 is a purely diagrammatic view showing an optical prism system.

Figure 7 is a partly sectional elevational view of a single composite prism, and its mount, the section being taken along a plane of symmetry passing through a diameter of the prism linking the points of greatest and of smallest thickness of the same.

Figure 8 is a partly sectional elevational view the section being taken along a plane of symmetry through the outer casing and adjacent parts only.

Figure 9 is a fragmentary sectional plan view taken along the plane 9—9 in Figure 8.

Figure 10 is a perspective view of the control viewing member.

Figure 11 is a diagram illustrating the passage of rays through a unit.

In order to explain the principle on which the invention is based, reference may first be had to Figures 1 and 2. A prism, as well known, when inserted into the bundle of rays forming the image of an object, will magnify the image of the object in one direction to a larger extent than in a direction at right angles thereto, if the two surfaces through which the rays pass have a different (f. i. increased) inclination with respect to a line which may be considered as the optical axis of the system. This elongation of the image increases with the inclination of the surfaces of the prism towards a certain line representing the optical axis.

The elongation of the image occurs in the direction in which the sides of the prisms converge, or along a line in which a plane at right angles to the lines of intersections of optical surfaces of the prisms intersects the image plane. Obviously, if the prism is turned through 90°, the direction in which elongation of the image occurs after turning is also at right angles to the original direction.

If, therefore, two prisms are arranged in series in such a manner that the direction in which the optically active surfaces of each prism converge are at 180° to each other, parallel rays emanating from two specific points of an object in a plane intersecting the lines of intersection of the optically active prism surfaces at right angles, after passing the prism system, are again parallel, but the distance between the parallel rays emanating from the said two points is changed. The ratio of the distances between the parallel rays on both sides of the prism system depends on the inclination of the optically active surfaces.

Whether the image is enlarged or reduced depends, of course, on the fact which side of the prism system is turned towards the object and which side is turned towards the image.

If the prism systems should be so arranged that the lines of intersection (or directions of convergence) of the optically active surfaces of the single prisms of the systems are at right angles to each other, then there would be no distortion or elongation of the image, as equal magnification would occur in both directions of the image plane.

The invention is based on the above explained principles using these principles in a specific manner in order to obtain undistorted images of varying size.

As seen in Figure 1 of the drawings, the prism system consists of two units 10, 11, each unit consisting of a plurality of prisms, at least two, the optically active surfaces of which converge in diametrically opposite directions with respect to each other, while the direction in which these surfaces converge in the two units are at right angles to each other.

In the diagrams of Figures 1 and 2 the lines of intersection of two optically active surfaces of the prisms are shown at 20, 22 and 23 and 24, respectively. However, it will be understood that the edges forming this line of intersection are shown in the diagram only in order to facilitate explanation.

Each prism 12, 14 and 16, 18 is rotatable around an axis 15, 17, 19 and 29, respectively, which is parallel to the said edges 20, 22, 23, 24, respectively, said axis passing through the optical axis indicated in dotted lines or being arranged close to said axis. The optical axis is a continuation of the optical axis of a lens system, if the prism system described should be used in conjunction with such a lens system.

It will be clear that the rotation of the two prisms 12, 14 or 16, 18 of one of the units towards each other or away from each other increases or reduces the elongation (or compression) of the image obtained by this unit in one direction. The rotation of the prisms around their axes will, however, not change the parallelism of the rays entering the prism systems as rays which are parallel to the optical axis leave this system again in substantial parallelism to said axis. However, the angle between the two prisms of a unit 10 or 11 will affect the distance between the outgoing parallel rays leaving one of the units and therefore this angular position will determine the degree of expansion or compression of the image in one direction.

As the rays must pass both prism systems and as the edges of the two prism systems which form the lines of intersection of the optically active prism surfaces point in directions at right angles to each other, the expansion or compression of the image, as the prisms in the two units are inclined towards each other at the same angle, will be the same in the two directions at right angles to each other and therefore an expansion (or compression) of the image, for instance of the image produced by a lens system of a camera, will be produced which varies with the angle of inclination of the prisms of the units.

The prism system according to the invention therefore performs the function of variably enlarging or compressing without distortion.

As will be clear from the above the prism system must be held in a mount which couples the units so as to produce an equal angular movement of the prisms corresponding to the desired expansion or compression of the image. Such a mount is illustrated in Figures 3, 4 and 5 of the drawings.

It will be understood that while the prisms in Figures 1 and 2 are shown as being of square or of rectangular shape for the sake of a better diagrammatic illustration, they are in fact, preferably of a circular shape so as to resemble a lens. It will further be understood that on account of the enlargement which is desired the diameter of the two units is preferably different; it will be clear that the system may be used for expansion and compression according to the pair of prisms which is turned towards the object and towards the image receiving plane respectively.

Each of the circular prisms of each unit is mounted in a ring 25. Only the uppermost ring is shown in Figure 4 and the lowermost ring 25 is shown in Figure 5. All parts of the mount are the same for all prisms and they are only different with respect to size. Therefore, only those parts related to one of the prism mounts need be described and illustrated in detail.

Each ring 25 has two pivots 26, 27 which are journaled in the stepped tube 30 holding all the mounting rings, which stepped tube forms an inner tube surrounding the prism system. One of the pivots 27 associated with the prism 12 carries a small grooved roller or pulley 33. Likewise the corresponding pivot of the ring 25 holding the prism 14 carries a small grooved roller or pulley 32.

It will have been understood from the above explanation that the two prisms of a unit always rotate in opposite directions. They are therefore both moved by a spider shaped pulley operator 36 hugging the stepped cylindrical tube 30 and curved or bent accordingly in order to conform its inner surface to the cylindrical surface of the tube. The four arms of the spider shaped operator 41, 42, 43, 44 serve as points of attachment for wires, cables or cords 38, 40 moving the two grooved rollers or pulleys 32, 33. The wire, cable or cord 38 is attached to two of the arms 41, 42 and is wound around the grooved roller or pulley 33, the groove of the roller or pulley being sufficiently wide to allow a crossing of the wire or cable so that the latter may run fully around the entire periphery. Likewise the cable, wire or cord 40 attached to the arms 43 and 44 runs around a full 360° of the peirphery of the roller or pulley 32.

The spider 36 has a central pivot 45 with which it is fixed on the outer tube or casing 46 which surrounds the inner stepped tube 30, but in the example shown the spider is partly cylindrical and partly has the shape of a truncated cone.

The inner stepped tube or casing may carry an end piece 47 in the shape of a ring screwed into the threaded end of the said tube.

In the example illustrated in Figures 3 and 4, the outer tube or casing forming a handle is seated on a step 48 on the wide end of the stepped inner tube 30 which is provided with a collar or flange-like projection 49 serving as a guide. The other end of the outer tube or casing which forms the handle slides in a suitable recess or step 51 of the ring 47.

If this prism objective is to be used in connection with a camera, for instance, either the ring 47 or the sleeve like end 50 of the inner tube 30 may be frictionally or otherwise attached to the lens system of the camera or other apparatus serviced by the lens system.

It will be clear that an angular movement of the outer tube forming the handle around the axis of the tubes moves the pivot 45 angularly around the axis of the system, the outer tube sliding during such movement on the flange or collar 49 and the recessed portion 51 of the rings respectively. This displacement of the pivot 45 and spider 36 causes the spider to tilt around its pivot 45 which movement by pulling in one end of the cable, wire or cord moves the two grooved rollers or pulleys 32 and 33 always in opposite directions, the other end of the cable, wire or cord yielding. On account of the curved or concave-convex near cylindrical curvature of the spider the angular movement of the same keeps it always at the same distance from the tube during its angular movement.

The movement of the two prisms 16, 18 is produced in the same manner. The axes 19, 29 are, as above stated, at right angles to the axes 15, 17 and therefore the axes of pulleys 34 and 35 are on a generatrix of the inner stepped cylinder 30 which is at an angular distance of 90° with respect to the generatrix passing through pulleys 32 and 33.

In the example illustrated an elongated elliptical striplike pulley operator 54 is used instead of a spider which operator is curved or of such concave-convex shape that it hugs the cylindrical inner tube. It is pivotally connected with the outer casing in the center defined by the plane passing through the axes of the pulleys and the said outer casing by means of a pivot bolt 55 which may be provided with screw threads for the purpose of easily withdrawing it when disassembling the mount.

The elongated pulley operator is provided with ears or with lugs 56, 57, 58, 59 to which the end of the wires, cables or cords are attached, said wires, cables or cords being wound around the pulleys 34, 35 in the manner described in connection with pulleys 32, 33. If metal wires or cables or stranded wires are used they may be soldered to the elongated strip operator. It will be easily understood that the rotation of the outer tube or casing forming the handle displaces the piece 54 and this displacement will also rotate it around its pivot, pulling out the wire or cable or cord on one side of the pulleys and pulling in the said cable, wire or cord on the other side.

Everything being equal the rings and prisms will therefore be moved exactly through the same angle the pairs of a unit always moving precisely to the same extent in opposite directions.

A modification of the arrangement obtaining the same results, but requiring less precision work, is illustrated in Figures 7 to 10, Figure 6 diagrammatically illustrating the optical principles involved.

As seen in Figure 6 there are again four prisms 60, 62, 64, 66 shown here as pieces of circular shape, two prisms inclined towards each other again forming one unit, and the two units being again so arranged with respect to each other that the planes containing the lines of intersection in which the optically active surfaces converge are at right angles to each other.

However, in this modification, each prism consists of two elemental prisms or half prisms 61, 63. Further, the two prisms 60, 62, and 64, 66, are arranged at a fixed angle with respect to each other.

Adjustability of the arrangement is obtained by rotating the two elemental or half prisms with respect to each other thus placing the outer surfaces of the said elemental or half prisms in different angular relationship with respect to each other and with respect to the optical axis. This arrangement permits to obtain a very high precision with respect to the positions reached and the optical action performed.

The two methods above referred to, while operating in a different manner, produce completely equivalent results.

According to the method illustrated in Figures 1 and 2 the change is produced by tilting the prisms thus varying the angle of inclination of the optically active surfaces with respect to the optical axis. According to the method illustrated in Figure 6 however the angle of all (composite) prisms towards the optical axis is fixed. However, the rotation of the elemental prisms again changes the total or composite angle of the (outer) optically active surfaces of a composite prism with respect to a reference plane passing through the optical axis.

The equivalence of the optical effect obtainable by the two methods will be manifest when considering first the extreme positions, for instance that shown by prism 60 in Figures 6 and 7 which corresponds clearly to the extreme position of prism 12 in Figure 1. A rotation of the elemental prisms 61, 63 through 180° will produce an adjustment of prism 60 which corresponds clearly to prism 14 in the position shown in Figure 2. A similar comparison shows that prism 62 of Figure 6 with the elemental prisms 65, 67 as shown in this figure corresponds to prism 14 in the position shown in Figure 1 and after rotation of the elemental prisms through 180° to prism 12 in the position shown in Figure 2. As the rotation of the elemental prisms 61, 63 and 65, 67 clearly produces a gradual change between these extremes, the optical results, obtainable by tilting of the prisms and by rotation of the elemental prisms must be fully equivalent.

As seen in Figure 8 the essential housing element of the construction embodying the principle illustrated in Figure 6 is again the stepped inner tube 70 which may be of a construction which is somewhat similar to that of tube 30 in Figures 3 and 4. It is provided with a threaded end 72 carrying a ring 74 adapted to be removably attached to a lens system or to any other optical system in conjunction with which the prism objective is used which serves to retain the rotatable outer casing forming the handle 76 in a suitable guiding recess 78.

At the other end the stepped inner tube 70 again is provided with a collar with a slightly conical portion 80 the latter being used as a frictional mount on the lens system of a camera or on any other optical system in connection with which the prism system is used.

The inner stepped tube 70 contains four cell housings 81, 82, 83, 84 for the prisms, each cell housing consisting of a flat housing element inserted fixedly into the stepped tube and held therein by suitable means (not shown, such as setscrews, soldering or the like). As seen in Figure 7 each flat cell housing element has cylindrical walls fitting into the cylindrical walls of the inner stepped tube 70 and flat sides which are inclined with respect to the axis of the tube at an angle corresponding to the maximum angle desired.

Within each cell housing there are two cells 85 and 86 which may be cylindrical and which are provided with flanges 87, 88 which are preferably in contact with each other, and which are held and guided within a cylindrical recess 89 of the inner cylindrical wall 90 of the cell housing.

While the cylindrical outer walls of the cell housing 81 correspond to and fit into those of the inner tubes and are therefore concentric with the tube axis which is also the optical axis of the system, the cylindrical walls 85 surround an axis which is at right angles to the inclined flat base 91, of the cell housing, and therefore the axis of the cells are at an angle with respect to the optical axis which is complementary to the angle at which the flat end walls are inclined towards the tube axis.

The cylindrical cells 85 and 86 within the cell housing 81 are rotatable around the axis of the cell (marked in dotted lines).

Within each cell 85, 86 one of the wedged shaped elemental or half prisms (61, 63 . . .) hereinafter termed "wedges" are fixedly held. The wedge cells, as stated, are rotatable within the cell housing. Each wedge cell 85, 86 is provided with a pin 92, 94 which projects outwardly through a slot of the cell housing to which wires, stranded cables or cords 95, 96 respectively are fixed. Each of the wires, cables or cords runs along the wall to a pulley 98, 99 and surround the pulley, encircling about one-half of the periphery, then runs to the pin 94 of the second wedge cell held in the same cell housing. Any movement imparted to a wedge cell around the axis X—X, which is inclined to the optical axis of the tube axis is transmitted to the other wedge cell of the cell housing.

The pulleys may rotate around pins projecting from studs or bosses provided on or fixed to the inner walls 90 of the cell housing. The rotation of the cell changes the relative position of the wedges which form the prisms of the unit.

As seen in Figure 8 there are four cell housings 81, 82, 83, 84 each provided with two pins 92, 94, said pins projecting through slots 93 in the cell housing and through the stepped inner tube 70. They run in slots 101, 102 of the said tubes 70 located in planes which are inclined towards the tube axis at the same angle at which the cell housings are inclined towards the said axis. One of the pins 92, 94, for instance the pin 92, may project beyond the slots 101, 102 into a slot 103 provided on a lug, arm or shield 105 which projects from a position adjusting control ring 110. This ring surrounds inner stepped tube 70 and may be provided with two lugs 105 and 106, one of these lugs or shields projecting upwardly while the other projects downwardly each of these lugs or shields being provided with an axial slot 103, 107 respectively. The slot 107 operates a pin or pins projecting from the adjacent cell housing of the unit through suitably inclined slots 116, 117 in the stepped tube. In this way the control ring 110 may control the pins of the two cell housings of a unit simultaneously.

In order to operate the control ring 110 said ring may be provided with a link or with two links 112 pivoted to the control ring 110 by means of a pin 111 on one side and to the outer casing 76 by means of a further pivot (preferably formed by a threaded bolt or screw bolt 115) on the other side. The outer casing 76 forming a handle which may be manually rotated in the manner above described in connection with casing 30 moves the control rings 110 and 118 when it is manually moved, thereby also imparting a rotational movement to the projecting arms or brackets projecting from said ring which are provided with the axial slots 103, 107, 119, 121.

This rotational movement is also imparted to the pins 94 projecting through said slots which move along planes which are parallel to the faces of the wedges 61, 63 and simultaneously also rotates the wedges 65 and 67. Thus the movements of all wedges forming a unit are always positively coordinated.

It will also be seen that the movement of the casing will also rotate the control rings 118 and rotate in the manner already explained also the wedges 71, 73 and 75, 77.

It will thus be seen that the arrangement according to the manner in which it is associated with a lens system or other optical system provides an optical prism system or prism objective adapted to enlarge or reduce the image produced by the lens system without essential adjustment of the latter. In a camera, for instance, such an enlargement or reduction can only be produced by an additional lens or by another change of the lens system such as removal of a lens of a unit from the system and accompanied by a change of the focal distance. If such change of the focal distance is not feasible no means are at present available for enlarging or reducing the focus of interest in the picture. With an attachment such as above described, such enlargement or reduction is possible by inserting the prism objective into the path of the rays while maintaining the focal distance of the lens system substantially unchanged.

If properly constructed the enlargement will be distortion free. On the other hand, it may be desired to introduce a certain amount of distortion into the system either by removing one of the units or by changing the angular relationship of the two units using an angle which differs somewhat from 90°. The prism objective can then be used for producing pictures which are intentionally elongated or otherwise partly distorted in one direction, a feature which may be used in the same way in which anamorphotic lenses distorting pictures in one dimension may be used.

It will be clear that the details of construction may be changed and unessential parts may be added or removed without in any way affecting the essence of the invention as defined in the annexed claims.

What is claimed as new is as follows:

1. An optical system for producing an undistorted variable image enlargement or reduction, comprising two axially stationary pairs of prisms, aligned along an optical axis and spaced from each other, the prisms of each pair being symmetrically arranged with respect to a plane of symmetry at right angles to the optical axis and being permanently held relatively to each other in a position in which the plane of angular distortion in the two prisms is the same, and the two pairs being permanently held in a position relatively to each other in which the plane of angular distortion of the two pairs is at right angles to each other, means to adjust the inclination of the optically active surfaces of the two prisms of each pair toward the optical axis and towards each other, and means to produce the same relative adjustment of the optically active surfaces relatively to the optical axis in both pairs of prisms, by imparting an angular movement of the same extent to all the subunits of the system.

2. An optical system for producing an undistorted variable image enlargement or image reduction of an image produced by a main lens system, without adjustment of the latter, comprising two pairs of axially stationary cooperating prisms spaced along an optical axis, each pair of prisms forming a unit, the prisms of which are symmetrically arranged with respect to a plane of symmetry at right angles to the optical axis, are spaced along said optical axis and have the same plane of angular distortion, the optically active surfaces of each prism converging along a line parallel to the line towards which the optically active surfaces of the other prism of the line converge, the said parallel lines of convergence being located at opposite sides of the optical axis, each of the prisms of each unit being further rotatably adjustable around an axis substantially intersecting the optical axis of the system at right angles, means for adjusting simultaneously and to the same extent the inclination of the optically active surfaces of the prisms of a pair towards the optical axis of the system, the pairs of cooperating prisms being so arranged with respect to each other that the planes of angular distortion and the lines of convergence of the optically active surfaces in the two pairs are at right angles to each other, and means for producing the [same adjustment] of the relative positions of the prisms in both cooperating prism units by imparting an angular movement of the same extent to all the sub-units of the system.

3. An optical system for producing an undistorted variable image enlargement or image reduction of an image produced by a main lens system, without adjustment of the latter, comprising two pairs of axially stationary cooperating prism units, spaced along an optical axis, each unit consisting of two prisms, spaced along the optical axis, and so arranged that the plane of angular distortion of the two prisms is permanently the same, the optically active surfaces of the two prisms of a pair being symmetrically disposed with respect to a plane perpendicular to the optical axis and coverging in parallel lines located on opposite sides of the optical axis, each of said prisms being rotatably adjustable around an axis substantially intersecting the optical axis at right angles, and the two prism units being so arranged with respect to each other that the planes of angular distortion of the two units which intersect the lines of intersection of the optically active surfaces at right angles, are at right angles to each other, means for linking the prisms of each of the units positively so as to move them simultaneously, preserving their symmetric position relatively to a plane at right angles to the optical axis, and means for linking the units positively, so as to change, by imparting a rotational movement, the angular positions of the prisms of both units to the [same extent] symmetrically with respect to a plane parallel to their axes of rotation.

4. An optical prism system as claimed in claim 1, wherein the prisms of the prism units are of circular shape and are all enclosed within a stepped cylindrical tube.

5. An optical prism system as claimed in claim 2, wherein the prisms of the prism units are of circular shape and are enclosed within a stepped inner tube, and wherein each prism of circular shape is enclosed within a ring provided with pivot pins, said pins being journaled in the inner stepped tube, each ring being connected with coupling means, an operator member for operating simultaneously the coupling means of one unit, and a manually operated means for operating the operator means of the units simultaneously.

6. An optical prism system as claimed in claim 2, wherein the prisms of the prism units are of circular shape and are enclosed within a stepped inner tube, and wherein each prism of circular shape is enclosed within a ring provided with pivot pins, said pins being journaled in the inner stepped tube, one of the pins of each ring carrying a grooved pulley, an operating member with arms, said arms being connected with a movement transmitting pulley encircling means for each pulley connected with a prism holding ring of a unit, said operating member thus moving simultaneously the prisms of a unit.

7. An optical prism system as claimed in claim 2, wherein each prism of each unit is held in a ring and each ring is provided with pivots, a stepped inner tube surrounding the prism system, and journaling the pivots of the prism holding rings, and wherein the means for adjusting the relative position of the prisms of a unit consist in a grooved pulley carried by one of the pivots of each ring, a wire shaped movement transmission member wound around each pulley, a pivoted operating member provided with means for attaching the ends of each wire shaped movement transmission member wound around each pulley to said operating member, a pivot for each of said last named members to produce a swinging movement of the same, said swinging movement moving the pulleys of a unit in opposite directions, a manually operated, handle forming shell surrounding the inner stepped tube, carrying the said pivots, the movement of said shell displacing the operating members and rotating them around their pivots, said rotation moving the pulleys and thereby the rings and prisms in opposite directions to the same extent.

8. An optical prism system as claimed in claim 1, wherein each prism consists of two elemental wedge-shaped prismatic members facing each other along parallel surfaces, the optically active surface of each wedge-shaped elemental prismatic member being inclined towards said parallel surfaces, and the latter being inclined towards the optical axis, each of the wedge-shaped prismatic members being enclosed in a cell, and the two cells being enclosed in a common cell housing, and an inner tube in which the cell housings are fixedly mounted at an angle to the axis of the inner tube, the cell housings for prisms forming a unit being inclined at the same angle towards the axis of the tube but in opposite directions.

9. An optical prism system as claimed in claim 1, wherein each prism consists of two elemental wedge-shaped prismatic members facing each other along parallel surfaces, the optically active surface of each wedge-shaped elemental prismatic member being inclined towards said parallel surfaces, and the latter being inclined towards the optical axis, each of the wedge-shaped prismatic members being enclosed in a cell, and the two cells being enclosed in a common cell housing, an inner tube in which the cell housings are fixedly mounted at the same angle with respect to the axis of the inner tube, adjacent cell housings being however inclined in opposite directions, means for rotating the two cells holding the elemental wedge-shaped prismatic members in one cell housing in opposite directions to the same extent and means for coupling the aforesaid cell rotating means, so as to produce an equal rotational movement of the cells in the cell housings.

10. An optical prism system as claimed in claim 1, wherein each prism consists of two elemental wedge-shaped prismatic members facing each other along parallel surfaces, the optically active surfaces of each wedge-shaped elemental prismatic member being inclined towards said parallel surfaces, and the latter being inclined towards the optical axis, each of the wedge-shaped prismatic members being enclosed in a cell, and the two cells being enclosed in a common cell housing, and rotatably held therein, an inner tube in which the cell housings are fixedly mounted at the same angle with respect to the axis of the inner tube, adjacent cell housings being inclined in opposite direction, means for rotating the two cells held in one cell housing and the two wedge-shaped prismatic members forming an optical prism in opposite directions to the same extent, said means including pins projecting from each cell into inclined slots in the inner tube, pulleys mounted on said cell housing, traction means wound around said pulleys and connected with said pins to produce movement of the pins in opposite directions, and means for coupling the aforesaid cell rotating means so as to produce an equal rotational movement of the cells in all cell housings.

11. An optical prism system as claimed in claim 1, wherein each prism consists of two elemental wedge-shaped prismatic members facing each other along parallel surfaces, the optically active surfaces of each wedge-shaped elemental prismatic member being inclined towards said parallel surfaces, and the latter being inclined towards the optical axis, each of the wedge-shaped prismatic members being enclosed in a cell, and the two cells being enclosed in a common cell housing, and rotatably held therein, an inner tube in which the cell housings are fixedly mounted at the same angle with respect to the axis of the inner tube, adjacent cell housings being inclined in opposite directions, means for rotating the two cells held in one cell housing and the two wedge-shaped prismatic members forming an optical prism in opposite directions to the same extent, said means including pins projecting from each cell into inclined slots in the inner tube, pulleys mounted on said cell housing, traction means wound around said pulleys and connected with said pins to produce movement of the pins in opposite directions, one of said pins in each cell housing projecting through the slots in the inner tube, a connecting ring surrounding said inner tube and coupled with said projecting pins of a cell housing and an outer rotatable shell serving as a handle seated on the inner tube and coupled with the connecting rings, to produce simultaneous rotational movements of the cells in the cell housings.

12. An optical prism system as claimed in claim 1, wherein each prism consists of two elemental wedge-shaped prismatic members facing each other along parallel surfaces, the optically active surface of each wedge-shaped elemental prismatic member being inclined towards said parallel surfaces, and the latter being inclined towards the optical axis, each of the wedge-shaped prismatic members being enclosed in a cell, and the two cells being enclosed in a common cell housing and rotatably held therein, an inner tube in which the cell housings are fixedly mounted at the same angle with respect to the axis of the inner tube, adjacent cell housings being inclined in opposite directions, means for rotating the two cells held in one cell housing and the two wedge-shaped prismatic members forming an optical prism in opposite directions to the same extent, said means including pins projecting from each cell into inclined slots in the inner tube, pulleys mounted on said cell housing, traction means wound around said pulleys and connected with said pins to produce movement of the pins in opposite directions, one of the pins in each cell housing projecting through slots of the inner tube outwardly, a connecting ring provided with slotted lugs, the pins of the cell housings of one unit projecting into slotted lugs, said connecting ring being arranged for angular movement around the inner tube, an outer rotatable shell serving as a handle, rotatably held on and surrounding said inner tube, said outer rotatable shell being coupled with the connecting rings, so that a movement of the shell angularly displacing the connecting rings rotates the cells and elemental wedge-shaped prismatic members.

13. An optical prism system as claimed in claim 1, including a plurality of centro-symmetrical cell housings each inclined at an angle towards the axis of rotation, and each cell housing holding two elemental members, each of said members having an optically active surface inclined towards the axis of the cell housing, said elemental members being rotatable around the axis of the cell housing, so that their optically active surfaces adopt different angular positions with respect to the optical axis of the prism system, and wherein the means for adjusting the inclination of the optically active surfaces include means for rotating the two elemental members to the same extent around the axis of the cell housing.

References Cited in the file of this patent

UNITED STATES PATENTS

| | | |
|---|---|---|
| 818,553 | Phillips | Apr. 24, 1906 |
| 1,321,906 | Gehrmann | Nov. 18, 1919 |
| 1,647,631 | Ives | Nov. 1, 1927 |
| 1,680,534 | Garbutt et al. | Aug. 14, 1928 |
| 1,758,801 | Moses | May 13, 1930 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |
| 2,023,217 | Benford | Dec. 3, 1935 |
| 2,048,284 | Newcomer | July 21, 1936 |
| 2,375,634 | Dunning | May 8, 1945 |

FOREIGN PATENTS

| | | |
|---|---|---|
| 338,962 | Great Britain | Dec. 1, 1930 |

Disclaimer 2,816,481.—*Marvin P. Farley*, Cedar Grove, N.J. ADJUSTABLE OPTICAL PRISM SYSTEM FOR PRODUCING VARIATION IN SIZE OF IMAGES IN PROJECTORS AND CAMERAS. Patent dated Dec. 17, 1957. Disclaimer filed Mar. 7, 1960, by the assignee, *Eastman Kodak Company*.

Hereby enters this disclaimer to claim 1 of said patent.

[*Official Gazette April 19, 1960.*]